Nov. 21, 1944. E. H. WALLACE 2,363,213
MOLD
Filed Jan. 10, 1942

INVENTOR
Edward H. Wallace
BY
Lester J. Buckley
ATTORNEY

Patented Nov. 21, 1944

2,363,213

UNITED STATES PATENT OFFICE 2,363,213

MOLD

Edward H. Wallace, Detroit, Mich., assignor to United States Rubber Company, New York, N. Y., a corporation of New Jersey Application January 10, 1942, Serial No. 426,337

5 Claims. (Cl. 18—47)

This invention relates to molds. More particularly it relates to a mold having a resilient surface layer and a layer of non-resilient material attached to the resilient layer for the purpose of supporting and maintaining the first named layer in a relatively fixed position.

In the manufacture of molds for reproduction purposes and in which the original or master from which the mold is to be made contains indentations or other irregularities, it has been customary to apply a layer of rubber to the master. The rubber is usually applied in the form of a latex composition, and the article or master is dipped into the latex to provide thereon a series of sucessive coats, or the latex may be sprayed directly on the master. In either case, the rubber follows all the detailed formations on the master and provides a surface which is an accurate reverse replica of the master. One of the principal objections to this practice is that, after removal of the master, it is difficult to maintain the accurate dimensions originally imparted to the rubber layer due to the resiliency of the rubber. I have found that by a special treatment whereby the exposed surface of the rubber layer could be formed with many irregularities that a solid substance, such as plaster of Paris, could be readily attached to the rubber layer. Upon hardening of the plaster of Paris, the rubber layer becomes firmly attached thereto; thus, the original dimensions of the rubber layer are accurately preserved.

It is, therefore, among the objects of my invention to provide a rigid backing interlocked with flexible molding surface; to provide a reinforced flexible mold surface capable of retaining the accurate dimensions of the master; and to provide a mold which may be prepared economically and expeditiously. These and other objects and advantages will appear more fully in the following detailed description when considered with the accompanying drawing in which.

Figure 1:
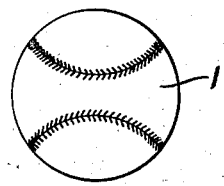
Fig. 1 is a side elevational view of an original article or master, such as, a baseball which is illustrative as an article for reproduction.
Figure 2:
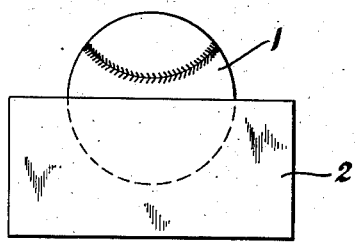
Fig. 2 is a side elevational view of the master imbedded in means to permit a one-half reproduction.

With reference to the drawing, and in particular to Fig. 1, I show an original article, or master 1, in the form of a baseball. However, it is to be understood that the baseball is illustrated for exemplary purposes only and that various other articles or shapes may be substituted therefor. A baseball has been illustrated because of the fine detail required to obtain a reproduction thereof, particularly with reference to the stitching and the minute details accompanying the stitching and the space thus formed by the marginal edges of the baseball cover. In order to obtain a replica from the master 1, it is general practice in cases of this kind where the master is spherical in form to provide a diametrical parting line to reduce the master for a one-half reproduction. This is accomplished by any conventional means, such as, by embedding the master 1 in a plaster of Paris support 2, as shown in Fig. 2. The master 1 is suspended in the plaster of Paris while the plaster is in a fluid state, and the parting surface is formed as the plaster hardens, thus one-half of the master 1 projects from the support 2.

Directly upon the exposed surface of the master and the adjoining surface of the support 2 is formed a layer 3 of resilient material, such as a rubber composition. Preferably, this layer is formed by spraying latex, or the equivalent artificial dispersion of rubber or rubber-like material, directly against the mold surface. In order to accomplish this, a conventional spray gun is employed, and a layer of latex in the order of 1/64 inch thick is applied to the mold surface. Directly after the application of the latex, a coagulant, such as, a mixture of alcohol and acetic acid is applied. The coagulant is also applied by a spray gun or other convenient means for effecting a deposit over the latex. After the treatment with the coagulant, the layer is allowed to dry for a short period of about five minutes, and additional coatings are applied in the same manner. This is continued until a desired thickness is obtained. When the rubber layer is formed over a master in which there is little or no undercutting, the total thickness of the layer 3 may be on the order of 1/16 inch. However, where the master includes undercuts and irregularities, the thickness of the layer 3 is increased to a point where the elasticity of the rubber will permit easy separation of the layer from the master. The following is an example of a latex composition which may be used to form the layer 3:

*Prevulcanized latex*

| | | |
|---|---|---|
| Rubber (60% total solids) | parts | 100 |
| Stabilizer | do | 0.5 |
| Sulfur | do | 0.25 |
| Activator | do | 0.5 |
| Accelerator | do | 0.5 |
| Antioxidant | do | 0.5 |
| Carbon black | do | 1.0 |
| Total solids | percent | 57.0 |

Figure 7:
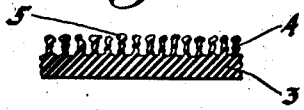
Fig. 7 is an enlarged detailed view, in section, of a portion of the rubber surface layer illustrating a surface formation; and, Fig. 8 is a transversed view, in section, illustrating a modification of the application shown in Fig. 3.

After the layer 3 has been built up to the desired thickness by the application of successive coats of latex, the outer surface of the layer is treated so as to provide an extremely irregular texture. This is accomplished by spraying latex and a coagulant simultaneously. In such cases the spray gun nozzles are held together to direct the combined latex-coagulant at the surface of the layer and at a distance of approximately 15 inches from the layer. As a result of the combined latex-coagulant spray, a treeing effect is produced in the form of a plurality of upstanding projections 4 (Fig. 7). These projections are readily formed to a length of from one-eighth inch to a quarter inch. After the projections have been formed, the position of the spray gun relative to the layer 3 may be rotated over an angle up to 180° with the result that nodules 5 are formed on the outermost tips of the projections 4. These nodules or enlarged portions serve to function as a locking means with material subsequently applied against the outer surface of layer 3. After the layer 3, together with its projections 4 and nodules 5 are formed, the layer is dried for a period of about ten hours at room temperature or about two hours at 140° F.

A backing material is next applied to the surface of the layer 3. Preferably, this supporting material is in the form of a backing 6 of plaster of Paris cast directly against the surface of the layer 3 and allowed to harden thereagainst. After the plaster has set, the application of heat is desirable. As a result of the application of the plaster 6 to the layer 3, the projections 4 and nodules 5 formed on the exterior surface of layer 3 become embedded in the plaster 6 and are therefore rigidly adhered to the plaster.

Figure 3:
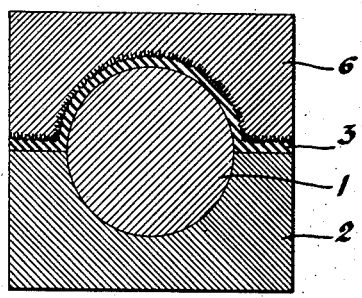
Fig. 3 is a transversed view, in section, of the master supporting means, rubber surface layer and backing.
Figure 8:
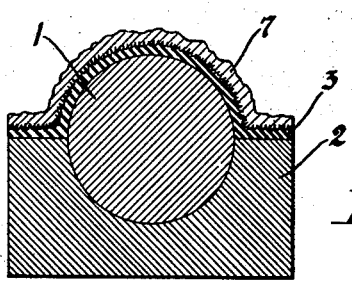

Figure 8 illustrates a modification of the disclosure shown in Figure 3 and shows a backing material 7 in the form of a metal of low melting point, such as, lead or solder, formed directly against the surface of the layer 3. The metal may be applied directly to the layer 3 by casting or by spraying the metal against the surface. In either case a rigid backing is formed which becomes interlocked with the layer 3 to maintain the resilient layer in a fixed position, thus establishing its dimensions accurately.

Figure 4:
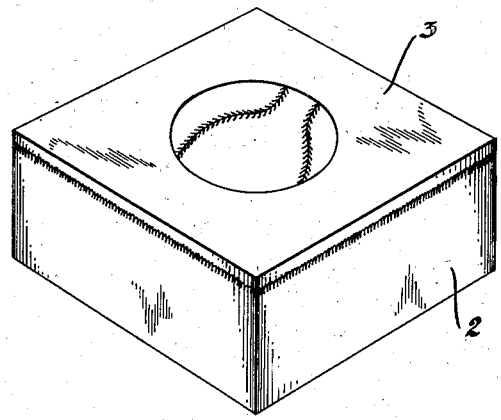
Fig. 4 is a perspective view illustrating the finished mold and comprising the rubber surface layer and backing.
Figure 5:
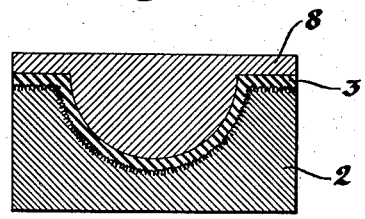
Fig. 5 is a transversed view in section of the rubber surface layer and a replica of the original article.

After the plaster backing 6 and the layer 3 are thoroughly dried, the backing 6 together with the layer is stripped from the master 1. The rigid adherence between the backing and layer prevents any permanent distortion of the layer 3 during the stripping operation and maintains the layer 3 in a position for convenient handling during subsequent operations. Figure 4 illustrates the mold after it is stripped from the master 1.

Figure 6:
Fig. 6 is a side elevational view of the complete replica.

While the backing 6 and the layer 3 complete the formation of the mold, it is sometimes desired to provide an iron mold having the identical surface details as present in the rubber layer 3. This can be accomplished by casting or spraying into the mold cavity, formed by the layer 3, a deposit 8 of an alloy having a low melting point. In such case the alloy, for example, "Cerrobase," which is a lead bismuth alloy having a melting point of about 254° F., is cast in the cavity of the layer 3 with the result that a half replica is formed of the original master 1, such as shown in Figure 6. This replica contains all the detail and undercut portions that are characteristic of the original master 1. It is to be understood that the mold, formed by the layer 3 and backing 6 may be employed as a finished mold within which finished products may be molded, providing that the product can be formed against the rubber layer without substantially deteriorating the rubber. An example of preferable materials are plaster, plastics, or other substances that may be molded in a liquid state and subsequently solidified. This replica 8 may now be used in an electroforming bath and a layer of iron electrodepositing thereon after which the replica 8 is melted therefrom leaving a completed iron mold having all the detail characteristics of the original master. Having thus obtained an iron mold, it may be used repeatedly in the formation of a replica of the original master of a composition which is resilient, such as, rubber. While a one-half mold is illustrated, it is to be understood that the other half of the mold may be formed in substantially the same manner to produce a completed article such as the spherical baseball illustrated in Figure 1.

While I have shown and described a mold and method of making same, it is to be understood that the invention is susceptible of those modifications which appear obviously within the spirit of the invention and as defined within the scope of the appended claims.

Having thus described my invention, what I desire to protect by Letters Patent is:

1. A mold comprising, a layer of resilient material one surface of which forms the mold face, a multiplicity of irregularly shaped projections of resilient material extending from the opposite surface of the resilient layer and a backing of rigid material contacting the said opposite surface of the resilient layer, said irregularly shaped projections being embedded in the rigid material and locking the backing to the resilient layer.

2. A mold comprising, a layer of resilient material one surface of which forms the mold face, a multiplicity of irregularly shaped projections of resilient material integral with and extending from the opposite surface of the resilient layer and at least some of said projections having enlarged nodules at the tips thereof, and a backing of rigid material contacting the said opposite surface of the resilient layer, said projections and nodules being embedded in the rigid material and locking the backing to the resilient layer.

3. A mold comprising, a layer of rubber one surface of which forms the mold face, a multiplicity of irregularly shaped rubber projections extending from the opposite surface of the rubber layer, and a backing of plaster of Paris contacting the said opposite surface of the rubber layer, said irregularly shaped projections being embedded in the plaster of Paris and locking the backing to the rubber layer.

4. A mold comprising, a layer of rubber one surface of which forms the mold face, a multiplicity of irregularly shaped rubber projections integral with and extending from the opposite surface of the rubber layer and at least some of the said projections having enlarged nodules at the tips thereof, and a backing of plaster of Paris contacting the said opposite surface of the rubber layer, said rubber projections and nodules being embedded in the plaster of Paris and locking the backing to the rubber layer.

5. A mold comprising, a layer of rubber one surface of which forms the mold face, a multiplicity of irregularly shaped rubber projections extending from the opposite surface of the rubber layer, and a backing of metal contacting the said opposite face of the rubber layer, said irregularly shaped projections being embedded in the metal and locking the backing to the rubber layer.

EDWARD H. WALLACE.